US012098574B2

(12) United States Patent
Xiong et al.

(10) Patent No.: US 12,098,574 B2
(45) Date of Patent: Sep. 24, 2024

(54) BIOLOGICAL IDENTIFICATION SAFE DEPOSIT BOX AND LOCKING AND UNLOCKING METHOD THEREOF

(71) Applicant: SHENZHEN FINGERCHIP IOT TECHNOLOGY CO., LTD, Shenzhen (CN)

(72) Inventors: Minghua Xiong, Shenzhen (CN); Haiping Yi, Shenzhen (CN); Jun Yu, Shenzhen (CN)

(73) Assignee: SHENZHEN FINGERCHIP IOT TECHNOLOGY CO., LTD, Shenzhen (CN)

( * ) Notice: Subject to any disclaimer, the term of this patent is extended or adjusted under 35 U.S.C. 154(b) by 239 days.

(21) Appl. No.: 17/875,431

(22) Filed: Jul. 28, 2022

(65) Prior Publication Data

US 2023/0392414 A1 Dec. 7, 2023

(30) Foreign Application Priority Data

Jun. 2, 2022 (CN) ......................... 202210625038.2

(51) Int. Cl.
*E05B 47/00* (2006.01)
*E05B 65/00* (2006.01)
*E05G 1/04* (2006.01)

(52) U.S. Cl.
CPC ...... *E05B 47/0012* (2013.01); *E05B 65/0075* (2013.01); *E05G 1/04* (2013.01); *E05B 2047/0017* (2013.01)

(58) Field of Classification Search
CPC ................. E05B 47/00; E05B 47/0012; E05B 2047/0014; E05B 2047/0015; E05B 2047/0016; E05B 2047/0017; E05B 65/00; E05B 65/0075; E05B 65/0082; E05G 1/00; E05G 1/005; E05G 1/02; E05G 1/024; E05G 1/026
USPC ........................................................ 70/279.1
See application file for complete search history.

(56) References Cited

FOREIGN PATENT DOCUMENTS

CN 212535362 U * 2/2021
CN 214532395 U * 10/2021
CN 214835539 U * 11/2021

* cited by examiner

*Primary Examiner* — Nathan Cumar

(57) ABSTRACT

A biological identification safe deposit box includes a lock. The lock includes a first elastic lock catch, a first connecting rod, a second elastic lock catch, a second connecting rod, a transmission rotating disc, a driving motor, and a motor controller. A movable groove is defined in a center of the transmission rotating disc. A movable end of the driving motor extends into the movable groove. A driving block is disposed on a side surface of the movable end of the driving motor. A semi-annular adjusting groove, with respect to the driving block, is defined on an inner wall of the movable groove. An idle stroke exists when the driving block moves in the semi-annular adjusting groove. The lock further includes an emergency unlocking assembly. The emergency unlocking assembly drives the transmission rotating disc to rotate. The emergency unlocking assembly and the transmission rotating disc are separately disposed.

10 Claims, 4 Drawing Sheets

BIOLOGICAL IDENTIFICATION SAFE DEPOSIT BOX AND LOCKING AND UNLOCKING METHOD THEREOF

TECHNICAL FIELD

The present disclosure relates to a technical field of safe deposit boxes, and in particular to a biological identification safe deposit box and a locking and unlocking method thereof.

BACKGROUND

Locks on safe deposit boxes for storing valuable items such as money and jewelry are mostly provided with a single lock head, and a locked point of which is disposed at a middle position, resulting in relatively weak reliability. But for locks with double lock heads, it is necessary to ensure synchronous unlocking of the double lock heads and consider a design of unlocking an emergency mechanical key at the same time. At present, most of the double lock heads are provided with two motors, each of the two motors drives a respective lock head, and synchronization of the two motors is controlled through a circuit, which makes power consumption, cost, and volume of a whole lock body become larger, and has complex installation and debugging.

SUMMARY

The present disclosure aims to provide a biological identification safe deposit box to solve defects of above existing technologies, and further provides a locking and unlocking method of the biological identification safe deposit box.

Technical solutions adopted by the present disclosure are as follows.

The present disclosure provides the biological identification safe deposit box, including a lock. The lock includes a first elastic lock catch, a first connecting rod, a second elastic lock catch, a second connecting rod, a transmission rotating disc, a driving motor, and a motor controller. The first connecting rod drives the first elastic lock catch to perform a first unlocking action. The second connecting rod drives the second elastic lock catch to perform a second unlocking action. The transmission rotating disc drives the first connecting rod and the second connecting rod to synchronously move. The driving motor drives the transmission rotating disc to rotate. Two opposite positions of an edge of the transmission rotating disc are respectively in transmission connection with the first connecting rod and the second connecting rod. A movable groove is defined in a center of the transmission rotating disc. A movable end of the driving motor extends into the movable groove. A driving block is disposed on a side surface of the movable end of the driving motor. A semi-annular adjusting groove, with respect to the driving block, is defined on an inner wall of the movable groove. An idle stroke exists when the driving block moves in the semi-annular adjusting groove. The lock further includes an emergency unlocking assembly. The emergency unlocking assembly drives the transmission rotating disc to rotate. The emergency unlocking assembly and the transmission rotating disc are separately disposed.

Furthermore, the lock includes the first elastic lock catch, the second elastic lock catch, the driving motor, and a mounting bracket of the emergency unlocking assembly.

Furthermore, each of the first elastic lock catch and the second elastic lock catch both includes a first locking piece and a second locking piece. A middle portion of the first locking piece and a middle portion of the second locking piece are both rotatably connected to the mounting bracket through a rotating shaft. A concave locking groove is defined on a side surface of a first end of the first locking piece. A linkage convex block is disposed on a side surface of a second end of the first locking piece. A closing portion is disposed on a side surface of a first end of the second locking piece. The closing portion is configured to close an opening of the concave locking groove. A linkage toggle block is disposed on a second end of the second locking piece, and the linkage toggle block is matched with the second locking piece to toggle the linkage convex block. Each of the first elastic lock catch and the second elastic lock catch includes an elastic component. The elastic component is configured to keep each of the first locking piece and the second locking piece in a locked state.

Furthermore, the second end, where the linkage toggle block is disposed on, of the second locking piece of the first elastic lock catch is rotatably connected to the first connecting rod. The first connecting rod is rotatably connected to the transmission rotating disc. The second end, where the linkage toggle block is disposed on, of the second locking piece of the second elastic lock catch is rotatably connected to the second connecting rod. The second connecting rod is rotatably connected to the transmission rotating disc.

Furthermore, both the first end, where the concave locking groove is disposed on, of the first locking piece and the first end, where the closing portion is disposed on, of the second locking piece are arc-shaped.

Furthermore, the mounting bracket includes a mounting plate and a cover plate. A mounting cavity is formed in one side of the mounting plate, and the cover plate covers the mounting cavity. The first elastic lock catch, the second elastic lock catch, and the transmission rotating disc are all disposed in the mounting cavity. The driving motor and the emergency unlocking assembly are disposed on the mounting plate.

Furthermore, the biological identification safe deposit box further includes a bottom housing and an upper cover, and the bottom housing and the upper cover are hinged. The lock is fixedly disposed on the bottom housing. Two perforated locking pieces are disposed on the upper cover. The two perforated locking pieces are matched with the first elastic lock catch and the second elastic lock catch. Two grooves are defined on the cover plate. The two grooves correspond to insertion of the two perforated locking pieces.

Furthermore, a transverse fixing plate is integrally formed at a lower end of the cover plate, and the transverse fixing plate is fixedly connected to an inner bottom surface of the bottom housing.

Furthermore, a toggle block is disposed on an outer side surface of the transmission rotating disc. The emergency unlocking assembly includes a mechanical lock and a mechanical key, and the mechanical lock and the mechanical key are matched. A toggle piece is disposed on a movable end of the mechanical lock, and the toggle piece is configured to toggle the toggle block.

The locking and unlocking method of the biological identification safe deposit box includes an unlocking process and an emergency unlocking process.

The unlocking process includes following steps:

- receiving an unlocking instruction by the motor controller, controlling the driving motor to rotate in a direction until the driving block is in contact with one end of the movable groove;
- continuing to run the driving motor, driving the transmission rotating disc to rotate, driving the first connecting rod and the second connecting rod to synchronously move to trigger the first elastic lock catch and the second elastic lock catch to synchronously move for unlocking; and after unlocking, continuing to run the driving motor, and when a locked rotor current of the driving motor reaches a set value, reversely rotating the driving motor a set distance, so that the driving block is in a middle position of the idle stroke.

The emergency unlocking process includes following steps:

when triggering the emergency unlocking assembly, moving the movable end of the mechanical lock of the emergency unlocking assembly to contact the transmission rotating disc and driving the transmission rotating disc to rotate, driving the first connecting rod and the second connecting rod to synchronously move to trigger the first elastic lock catch and the second elastic lock catch to synchronously move for unlocking.

Beneficial effects of the present disclosure are as follows

The present disclosure provides a locking and unlocking method of the biological identification safe deposit box including the unlocking process and the emergency unlocking process. The unlocking process includes the steps of receiving an unlocking instruction by the motor controller, controlling the driving motor to rotate in a direction until the driving block is in contact with one end of the movable groove, continuing to run the driving motor, driving the transmission rotating disc to rotate, driving the first connecting rod and the second connecting rod to synchronously move to trigger the first elastic lock catch and the second elastic lock catch to synchronously move for unlocking, and after unlocking, continuing to run the driving motor, and when a locked rotor current of the driving motor reaches a set value, reversely rotating the driving motor a set distance, so that the driving block is in a middle position of the idle stroke. The includes the steps of when triggering the emergency unlocking assembly, moving the movable end of the mechanical lock of the emergency unlocking assembly to contact the transmission rotating disc and driving the transmission rotating disc to rotate, driving the first connecting rod and the second connecting rod to synchronously move to trigger the first elastic lock catch and the second elastic lock catch to synchronously move for unlocking. The biological identification safe deposit box of the present disclosure locks two the first elastic lock catch and the second elastic lock catch through the single driving motor. Moreover, each time the motor completes an action of unlocking, the motor may automatically turn back to an idle position without extra debugging, which further forms avoidance for the emergency unlocking at the same time and may not interfere is the emergency unlocking. The biological identification safe deposit box of the present disclosure is reasonable and compact in structure, small in volume, good in locking reliability, low in power consumption and cost of a lock body, and most importantly, a trouble of assembling and debugging the lock body is not required.

BRIEF DESCRIPTION OF DRAWINGS

In order to more clearly illustrate technical solutions of embodiments of the present disclosure or technical solutions in prior art, the present disclosure is further described below with reference to accompanying drawings and the embodiments. The accompanying drawings in following descriptions are only some embodiments of the present disclosure, and for a person of ordinary skill in the art, other drawings are obtained according to the accompanying drawings without creative efforts.

DETAILED DESCRIPTION

In order to make objectives, technical solutions and advantages of embodiments of the present disclosure clearer, the technical solutions in the embodiments of the present disclosure are clearly and completely described below with reference to the technical solutions in the embodiments of the present disclosure. Obviously, the described embodiments are part of the embodiments of the present disclosure and are not all embodiments. Based on the embodiments of the present disclosure, all other embodiments obtained by a person of ordinary skill in art without creative efforts shall fall within a protection scope of the present disclosure.

Figure 1:
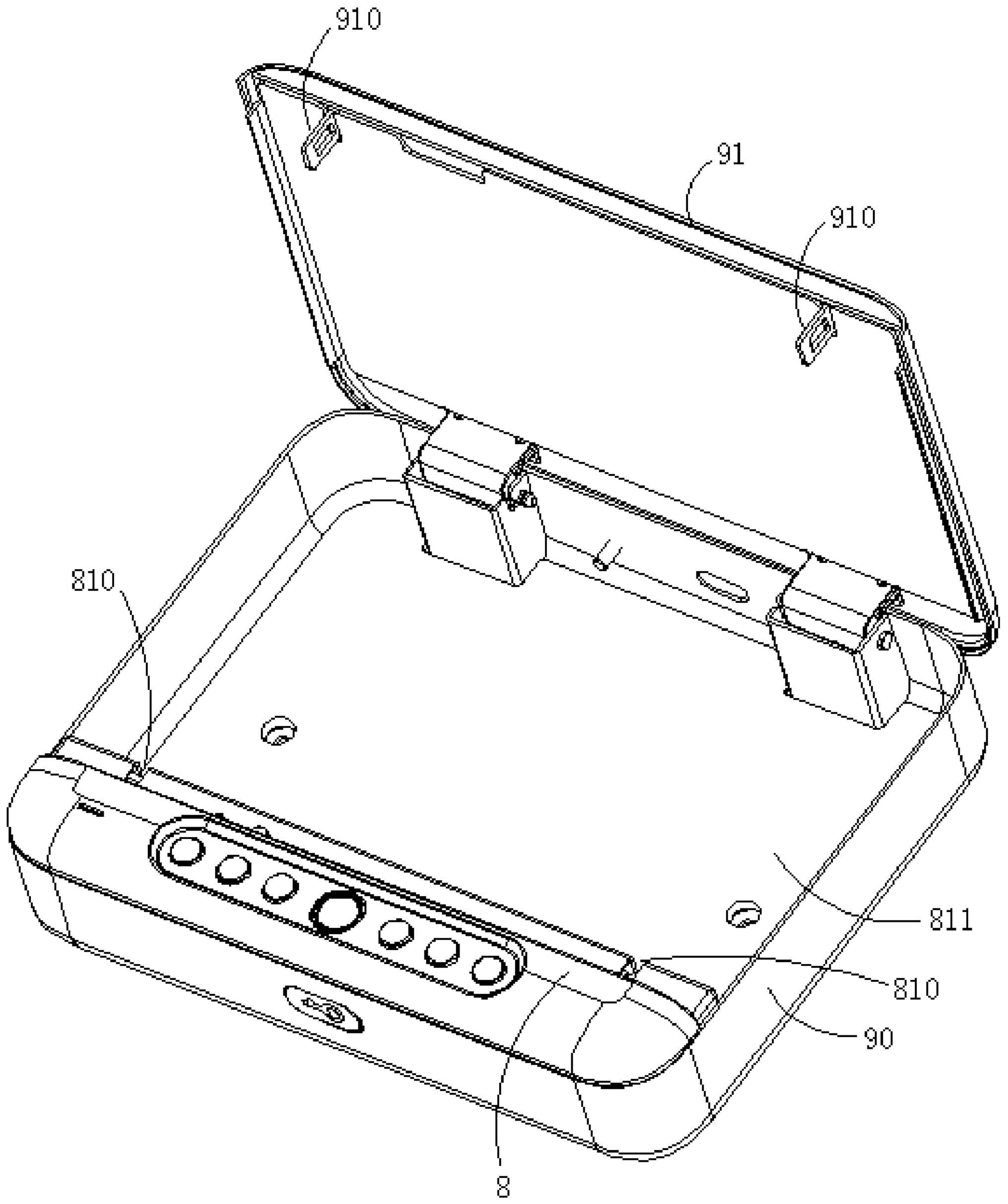
FIG. 1 is an overall structural schematic diagram of a biological identification safe deposit box according to one embodiment of the present disclosure.
Figure 2:
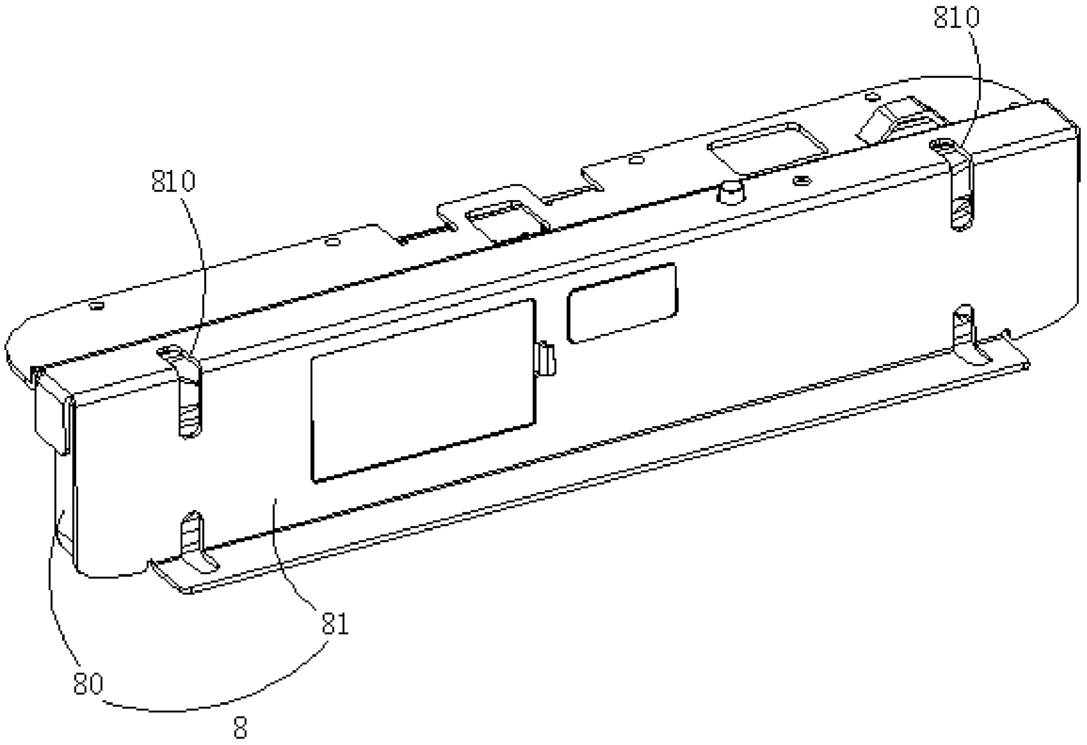
FIG. 2 is a structural schematic diagram of a mounting bracket of the biological identification safe deposit box according to one embodiment of the present disclosure.
Figure 3:
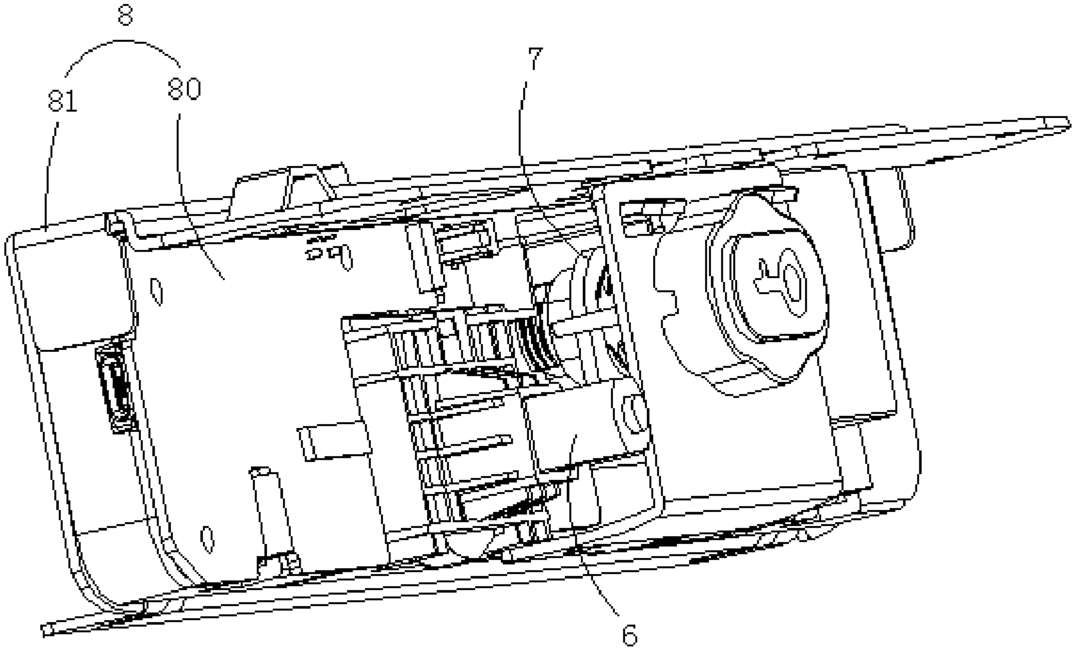
FIG. 3 is a structural schematic diagram of the mounting bracket of the biological recognition safe deposit box at another angle according to one embodiment of the present disclosure.
Figure 4:
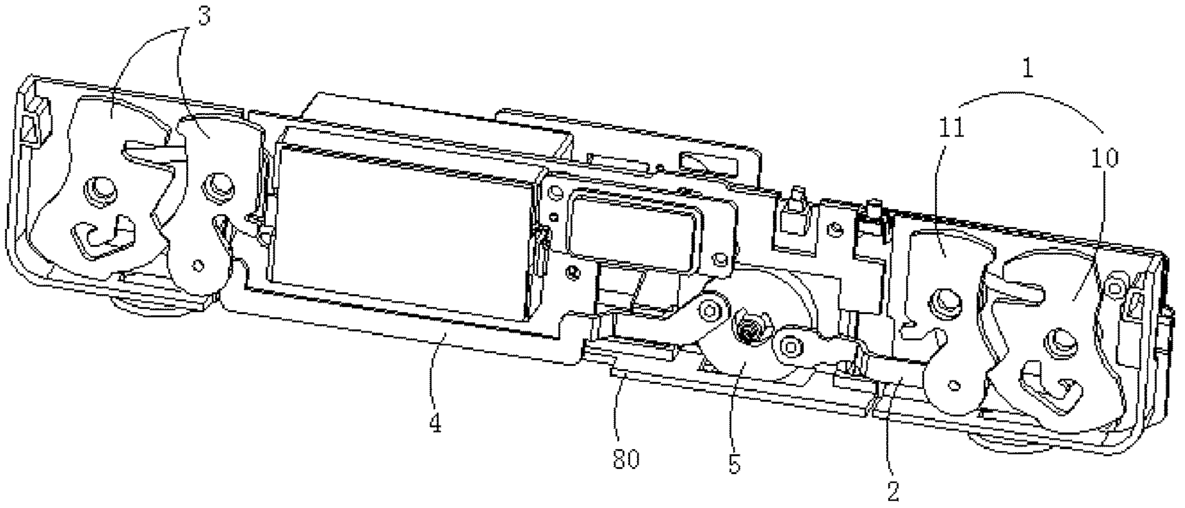
FIG. 4 is a schematic diagram of a transmission portion of the biological identification safe deposit box according to one embodiment of the present disclosure.
Figure 5:
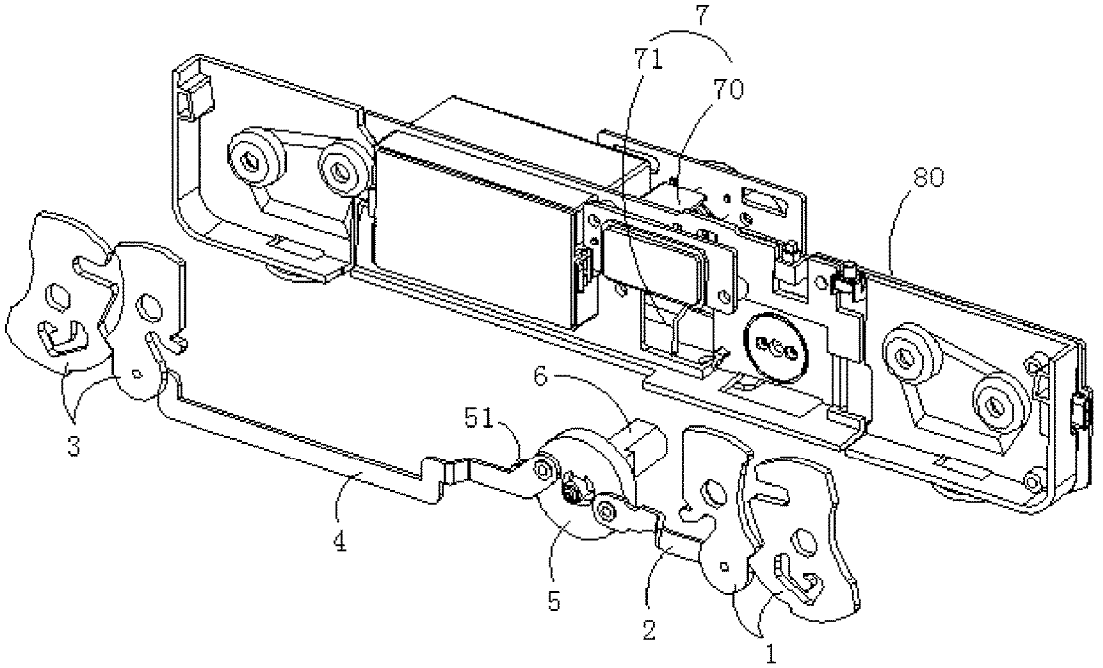
FIG. 5 is an exploded schematic diagram of the transmission portion of the biological identification safe deposit box according to one embodiment of the present disclosure.
Figure 6:
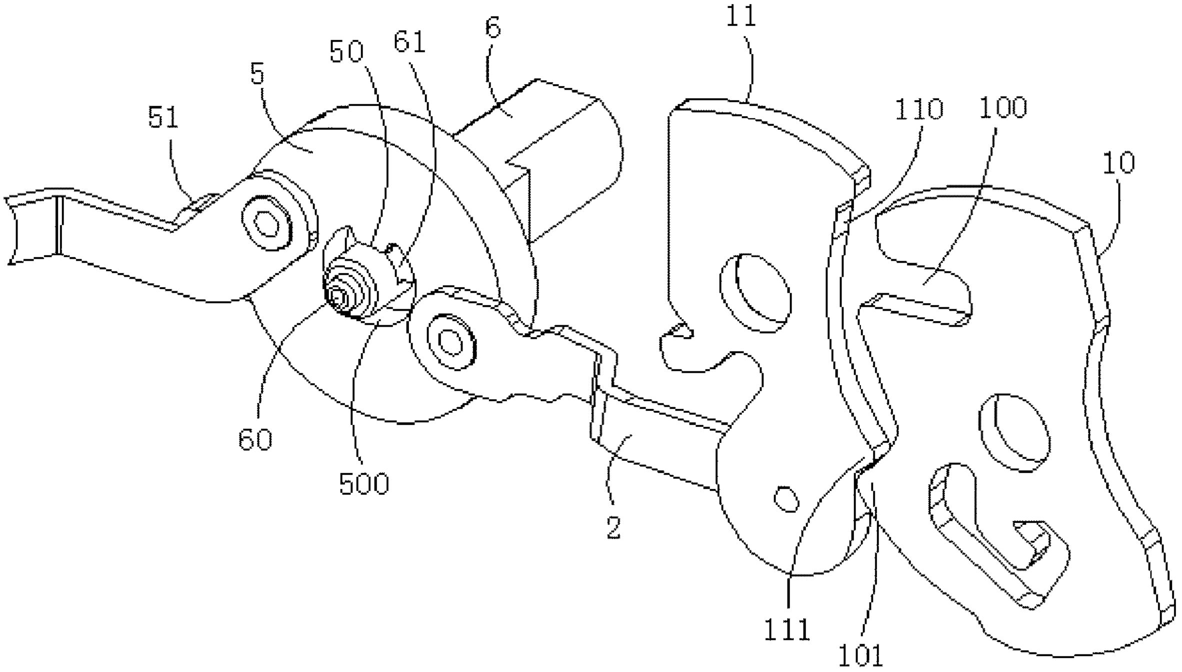
FIG. 6 is an enlarged schematic diagram of a first connecting rod, a first elastic lock catch, a transmission rotating disc, and a driving motor of the biological identification safe deposit box according to one embodiment of the present disclosure.

A biological identification safe deposit box according to one, embodiment of the present disclosure, as shown in FIG. 1 in view of FIGS. 2-6, includes a lock. The lock includes a first elastic lock catch 1, a first connecting rod 2, a second elastic lock catch 3, a second connecting rod 4, a transmission rotating disc 5, a driving motor 6, and a motor controller. The first connecting rod 2 drives the first elastic lock catch 1 to perform a first unlocking action. The second connecting rod 4 drives the second elastic lock catch 3 to perform a second unlocking action. The transmission rotating disc 5 drives the first connecting rod 2 and the second connecting rod 4 to synchronously move. The driving motor 6 drives the transmission rotating disc 5 to rotate. Two opposite positions of an edge of the transmission rotating disc 5 are respectively in transmission connection with the first connecting rod 2 and the second connecting rod 4, preferably using a rotating connection method. A movable groove 50 is defined in a center of the transmission rotating disc 5. A movable end 60 of the driving motor 6 extends into the movable groove 50. A driving block 61 is disposed on a side surface of the movable end 60 of the driving motor 6. A semi-annular adjusting groove 500, with respect to the driving block 61, is defined on an inner wall of the movable groove 50. An idle stroke exists when the driving block 61 moves in the semi-annular adjusting groove 500. The lock further includes an emergency unlocking assembly 7. The emergency unlocking assembly 7 drives the transmission rotating disc 5 to rotate. The emergency unlocking assembly 7 and the transmission rotating disc 5 are separately disposed.

A unlocking process is as follows: receiving an unlocking instruction by the motor controller, controlling the driving motor 6 to rotate in a direction until the driving block 61 is in contact with one end of the movable groove 50, continuing to run the driving motor 6, driving the transmission rotating disc 5 to rotate, driving the first connecting rod 2 and the second connecting rod 4 to synchronously move to trigger the first elastic lock catch 1 and the second elastic lock catch 3 to synchronously move for unlocking, and after unlocking, continuing to run the driving motor 6, and when a locked rotor current of the driving motor 6 reaches a set value, reversely rotating the driving motor 6 a set distance, so that the driving block 61 is in a middle position of the idle stroke. The locked rotor current is detected through a special sensor, and is further realized by a circuit controller having a detection function.

It should be noted that sources of unlocking instructions take various existing forms, such as fingerprint identification and other biometrics unlocking manners, Bluetooth and other remote unlocking manners, keys and other mechanical unlocking manners, passwords and other circuit unlocking manners, and so on.

The above-mentioned middle position is not intended to limit the feature as a central position, but is adaptively adjusted according to actual needs.

An emergency unlocking process is as follows: when triggering the emergency unlocking assembly 7, moving the movable end of a mechanical lock 70 of the emergency unlocking assembly 7 to contact the transmission rotating disc 5 and driving the transmission rotating disc 5 to rotate, driving the first connecting rod 2 and the second connecting rod 4 to synchronously move to trigger the first elastic lock catch 1 and the second elastic lock catch 3 to synchronously move for unlocking.

A purpose of emergency unlocking is to serve as a backup unlocking method in an event of failing to unlock, such as failures caused by aging wires, aging structures, and human factors, thereby the emergency unlocking process is a must. Of course, a set structure of the present disclosure is not limited to a following mechanical key unlocking method, and other set structures may be further used.

The biological identification safe deposit box of the present disclosure locks two the first elastic lock catch and the second elastic lock catch through the single driving motor. Moreover, each time the motor completes an action of unlocking, the motor may automatically turn back to an idle position without extra debugging, which further forms avoidance for the emergency unlocking at the same time and may not interfere is the emergency unlocking. The biological identification safe deposit box of the present disclosure is reasonable and compact in structure, small in volume, good in locking reliability, low in power consumption and cost of a lock body, and most importantly, a trouble of assembling and debugging the lock body is not required.

Optionally, the lock includes the first elastic lock catch 1, the second elastic lock catch 3, the driving motor 6, and a mounting bracket 8 of the emergency unlocking assembly 7.

Optionally, each of the first elastic lock catch 1 and the second elastic lock catch 3 includes a first locking piece 10 and a second locking piece 11. A middle portion of the first locking piece 10 and a middle portion of the second locking piece 11 are both rotatably connected to the mounting bracket 8 through a rotating shaft 12. A concave locking groove 100 is defined on a side surface of a first end of the first locking piece 10. A linkage convex block 101 is disposed on a side surface of a second end of the first locking piece 10. A closing portion 110 is disposed on a side surface of a first end of the second locking piece 11. The closing portion 110 is configured to close an opening of the concave locking groove 100. A linkage toggle block 111 is disposed on a second end of the second locking piece 11, and the linkage toggle block 111 is matched with the second locking piece 11 to toggle the linkage convex block 101. Each of the first elastic lock catch 1 and the second elastic lock catch 3 includes an elastic component (not shown in the drawings). The elastic component is configured to keep each of the first locking piece and the second locking piece in a locked state.

In a conventional state, the elastic component maintains a locking state in which the concave locking groove 100 and the closing portion 110 are attached. When the second locking piece rotates around a respective rotating shaft, the first locking piece is driven to rotate through cooperation of the linkage toggle block and the linkage convex block, thereby performing the unlocking action.

It should be noted that the first elastic lock catch and the second elastic lock catch further adopt other existing elastic lock catch forms, which are not limited herein.

Optionally, the elastic component is a torsion spring disposed on the rotating shaft, of course, other elastic action modes are further used.

Optionally, the second end, where the linkage toggle block is disposed on, of the second locking piece of the first elastic lock catch 1 is rotatably connected to the first connecting rod 2. The first connecting rod 2 is rotatably connected to the transmission rotating disc 5. The second end, where the linkage toggle block is disposed on, of the second locking piece of the second elastic lock catch 3 is rotatably connected to the second connecting rod 4. The second connecting rod 4 is rotatably connected to the transmission rotating disc 5. Structure is reasonable and compact, and transmission reliability is good.

Optionally, both the first end, where the concave locking groove is disposed on, of the first locking piece and the first end, where the closing portion is disposed on, of the second locking piece are arc-shaped, which is convenient for guiding during locking operation.

Optionally, the mounting bracket 8 includes a mounting plate 80 and a cover plate 81. A mounting cavity is formed in one side of the mounting plate 80, and the cover plate 81 covers the mounting cavity. The first elastic lock catch 1, the second elastic lock catch 3, and the transmission rotating disc 5 are all disposed in the mounting cavity. The driving motor 6 and the emergency unlocking assembly 7 are disposed on the mounting plate 80. The structure is reasonable and compact, the transmission reliability is good, and overall strength is large.

Optionally, the biological identification safe deposit box further includes a bottom housing 90 and an upper cover 91, and the bottom housing 90 and the upper cover 91 are hinged. The lock is fixedly disposed on the bottom housing 90. Two perforated locking pieces 910 are disposed on the upper cover 91. The two perforated locking pieces 910 are matched with the first elastic lock catch 1 and the second elastic lock catch 3. Two grooves 810 are defined on the cover plate 81 for insertion of the two perforated locking pieces 910. The structure is reasonable and compact, and integrity is good.

Optionally, a transverse fixing plate 811 is integrally formed at a lower end of the cover plate 81, and the transverse fixing plate 811 is fixedly connected to an inner bottom surface of the bottom housing 90, which is convenient for disassembly and assembly and has good integrity.

Optionally, a toggle block 51 is disposed on an outer side surface of the transmission rotating disc 5. The emergency unlocking assembly 7 includes a mechanical lock 70 and a mechanical key (not shown in the drawings), and the mechanical lock 70 and the mechanical key are matched. A toggle piece 71 is disposed on a movable end of the mechanical lock 70, and the toggle piece 71 is configured to toggle the toggle block.

The locking and unlocking method of the biological identification safe deposit box includes an unlocking process and an emergency unlocking process.

The unlocking process includes following steps:

receiving an unlocking instruction by the motor controller, controlling the driving motor to rotate in a direction until the driving block is in contact with one end of the movable groove;

continuing to run the driving motor, driving the transmission rotating disc to rotate, driving the first connecting rod and the second connecting rod to synchronously move to trigger the first elastic lock catch and the second elastic lock catch to synchronously move for unlocking; and after unlocking, continuing to run the driving motor, and when a locked rotor current of the driving motor reaches a set value, reversely rotating the driving motor a set distance, so that the driving block is in a middle position of the idle stroke.

The emergency unlocking process includes following steps:

when triggering the emergency unlocking assembly, moving the movable end of the mechanical lock of the emergency unlocking assembly to contact the transmission rotating disc and driving the transmission rotating disc to rotate, driving the first connecting rod and the second connecting rod to synchronously move to trigger the first elastic lock catch and the second elastic lock catch to synchronously move for unlocking.

The biological identification safe deposit box of the present disclosure locks two the first elastic lock catch and the second elastic lock catch through the single driving motor. Moreover, each time the motor completes an action of unlocking, the motor may automatically turn back to an idle position without extra debugging, which further forms avoidance for the emergency unlocking at the same time and may not interfere is the emergency unlocking. The biological identification safe deposit box of the present disclosure is reasonable and compact in structure, small in volume, good in locking reliability, low in power consumption and cost of a lock body, and most importantly, a trouble of assembling and debugging the lock body is not required.

It should be understood that, for the person of ordinary skill in the art, improvements or transformations are made according to above description, and all the improvements and transformations shall fall within the scope of protection of appended claims of the present disclosure.

What is claimed is:

1. A biological identification safe deposit box, comprising:

a lock;

wherein the lock comprises a first elastic lock catch, a first connecting rod, a second elastic lock catch, a second connecting rod, a transmission rotating disc, a driving motor, and a motor controller; the first connecting rod drives the first elastic lock catch to perform a first unlocking action, the second connecting rod drives the second elastic lock catch to perform a second unlocking action, the transmission rotating disc drives the first connecting rod and the second connecting rod to synchronously move, the driving motor drives the transmission rotating disc to rotate; two opposite positions of an edge of the transmission rotating disc are respectively in transmission connection with the first connecting rod and the second connecting rod; a movable groove is defined in a center of the transmission rotating disc; a movable end of the driving motor extends into the movable groove, a driving block is disposed on a side surface of the movable end of the driving motor; a semi-annular adjusting groove, with respect to the driving block, is defined on an inner wall of the movable groove; an idle stroke exists when the driving block moves in the semi-annular adjusting groove; the lock further comprises an emergency unlocking assembly, the emergency unlocking assembly drives the transmission rotating disc to rotate, and the emergency unlocking assembly and the transmission rotating disc are separately disposed.

2. The biological identification safe deposit box according to claim 1, wherein the lock comprises the first elastic lock catch, the second elastic lock catch, the driving motor, and a mounting bracket of the emergency unlocking assembly.

3. The biological identification safe deposit box according to claim 2, wherein each of the first elastic lock catch and the second elastic lock catch comprises a first locking piece and a second locking piece; a middle portion of the first locking piece and a middle portion of the second locking piece are both rotatably connected to the mounting bracket through a rotating shaft; a concave locking groove is defined on a side surface of a first end of the first locking piece, a linkage convex block is disposed on a side surface of a second end of the first locking piece; a closing portion is disposed on a side surface of a first end of the second locking piece, the closing portion is configured to close an opening of the concave locking groove; a linkage toggle block is disposed on a second end of the second locking piece, the linkage toggle block is matched with the second locking piece to toggle the linkage convex block; each of the first elastic lock catch and the second elastic lock catch comprises an elastic component, and the elastic component is configured to keep each of the first locking piece and the second locking piece in a locked state.

4. The biological identification safe deposit box according to claim 3, wherein the second end, where the linkage toggle block is disposed on, of the second locking piece of the first elastic lock catch is rotatably connected to the first connecting rod; the first connecting rod is rotatably connected to the transmission rotating disc; the second end, where the linkage toggle block is disposed on, of the second locking piece of the second elastic lock catch is rotatably connected to the second connecting rod, and the second connecting rod is rotatably connected to the transmission rotating disc.

5. The biological identification safe deposit box according to claim 3, wherein both the first end, where the concave locking groove is disposed on, of the first locking piece and the first end, where the closing portion is disposed on, of the second locking piece are arc-shaped.

6. The biological identification safe deposit box according to claim 2, wherein the mounting bracket comprises a mounting plate and a cover plate, a mounting cavity is formed in one side of the mounting plate, the cover plate covers the mounting cavity; the first elastic lock catch, the second elastic lock catch, and the transmission rotating disc are all disposed in the mounting cavity; and the driving motor and the emergency unlocking assembly are disposed on the mounting plate.

7. The biological identification safe deposit box according to claim 6, wherein the biological identification safe deposit box further comprises a bottom housing and an upper cover, the bottom housing and the upper cover are hinged, the lock is fixedly disposed on the bottom housing, two perforated locking pieces are disposed on the upper cover, the two perforated locking pieces are matched with the first elastic lock catch and the second elastic lock catch; two grooves are defined on the cover plate for insertion of the two perforated locking pieces.

8. The biological identification safe deposit box according to claim 7, wherein a transverse fixing plate is integrally formed at a lower end of the cover plate, and the transverse fixing plate is fixedly connected to an inner bottom surface of the bottom housing.

9. The biological identification safe deposit box according to claim 1, wherein a toggle block is disposed on an outer side surface of the transmission rotating disc, the emergency unlocking assembly comprises a mechanical lock and a mechanical key, the mechanical lock and the mechanical key are matched; a toggle piece is disposed on a movable end of the mechanical lock, and the toggle piece is configured to toggle the toggle block.

10. A locking and unlocking method of the biological identification safe deposit box according to claim 1, comprising an unlocking process and an emergency unlocking process;

wherein the unlocking process comprises following steps:

receiving an unlocking instruction by the motor controller, controlling the driving motor to rotate in a direction until the driving block is in contact with one end of the movable groove;

continuing to run the driving motor, driving the transmission rotating disc to rotate, driving the first connecting rod and the second connecting rod to synchronously move to trigger the first elastic lock catch and the second elastic lock catch to synchronously move for unlocking; and after unlocking, continuing to run the driving motor, and when a locked rotor current of the driving motor reaches a set value, reversely rotating the driving motor a set distance, so that the driving block is in a middle position of the idle stroke;

the emergency unlocking process comprises following steps:

when triggering the emergency unlocking assembly, moving the movable end of the mechanical lock of the emergency unlocking assembly to contact the transmission rotating disc and driving the transmission rotating disc to rotate, driving the first connecting rod and the second connecting rod to synchronously move to trigger the first elastic lock catch and the second elastic lock catch to synchronously move for unlocking.

* * * * *